(12) United States Patent
Kinkaide

(10) Patent No.: US 7,775,529 B2
(45) Date of Patent: Aug. 17, 2010

(54) INDEPENDENT ADJUSTABLE AXLE SUSPENSION SYSTEM

(75) Inventor: James R. Kinkaide, Elkhart, IN (US)

(73) Assignee: Wells Cargo, Inc., Elkhart, IN (US)

( * ) Notice: Subject to any disclaimer, the term of this patent is extended or adjusted under 35 U.S.C. 154(b) by 330 days.

(21) Appl. No.: 11/933,746

(22) Filed: Nov. 1, 2007

(65) Prior Publication Data

US 2009/0115154 A1 May 7, 2009

(51) Int. Cl.
*B60G 17/00* (2006.01)
(52) U.S. Cl. .................................. 280/6.153
(58) Field of Classification Search ............... 280/6.15, 280/6.153, 6.151, 6.154, 6.155, 6.157, 6.159, 280/6.16
See application file for complete search history.

(56) References Cited

U.S. PATENT DOCUMENTS 2,368,219 A * 1/1945 Heath ........................ 56/209
6,598,886 B2 * 7/2003 Baird et al. ............... 280/6.155
2009/0091095 A1 * 4/2009 Donlin ..................... 280/6.153

OTHER PUBLICATIONS

Drawings of suspension system, Wells Cargo, Inc., Sheets 1-4, Jun. 2005.

* cited by examiner

*Primary Examiner*—Faye M. Fleming
(74) *Attorney, Agent, or Firm*—Merchant & Gould P.C.

(57) ABSTRACT

An independent adjustable axle suspension system for mounting a wheel to a frame of a trailer for transport of the trailer over a support surface. The axle suspension system includes a tower adapted to be attached to the frame and an axle unit adapted to receive the wheel. The tower is selectively moveable with respect to the axle unit along guide assemblies between extended and retracted positions to thereby selectively position the height of the frame with respect to the support surface.

20 Claims, 7 Drawing Sheets

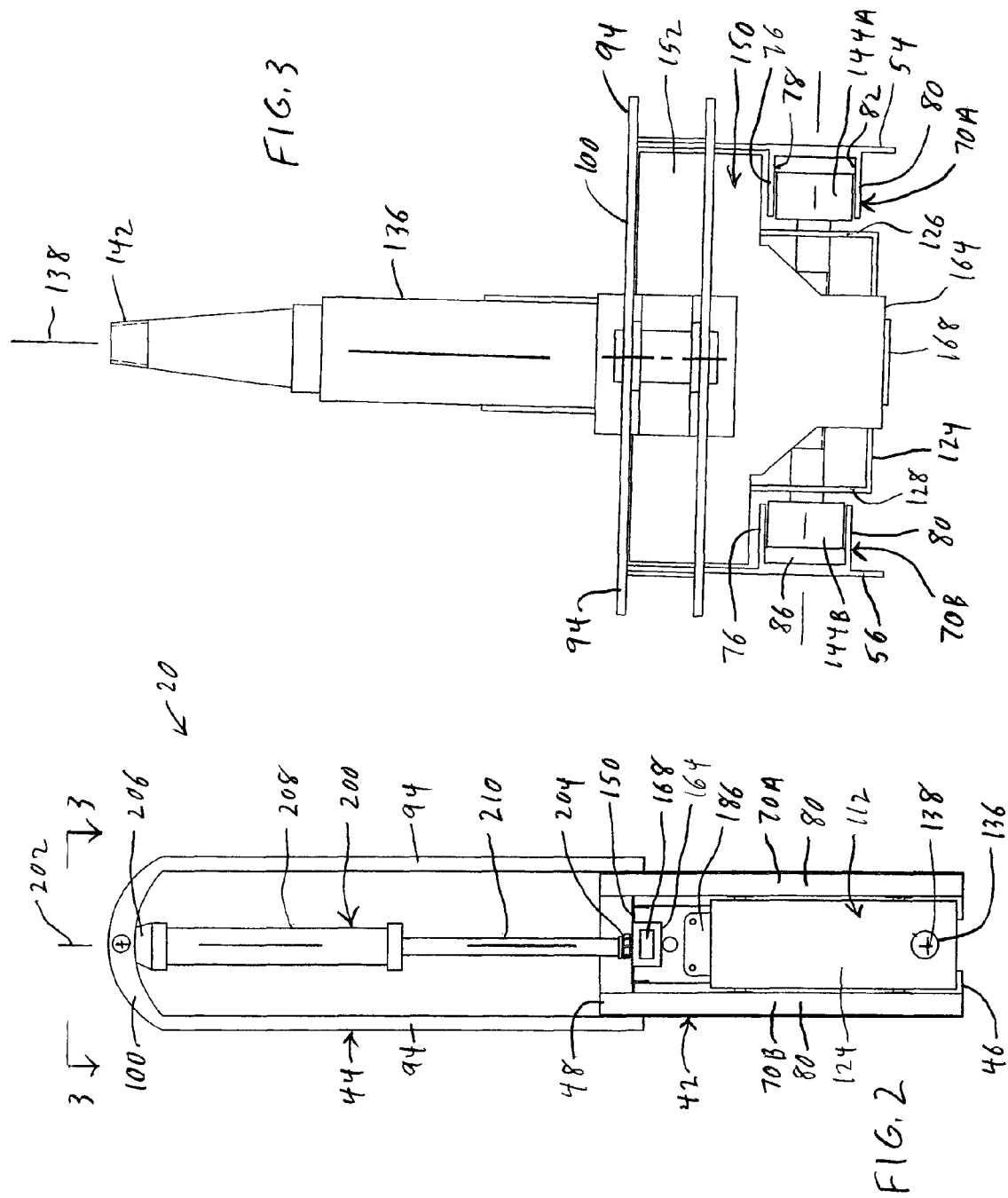

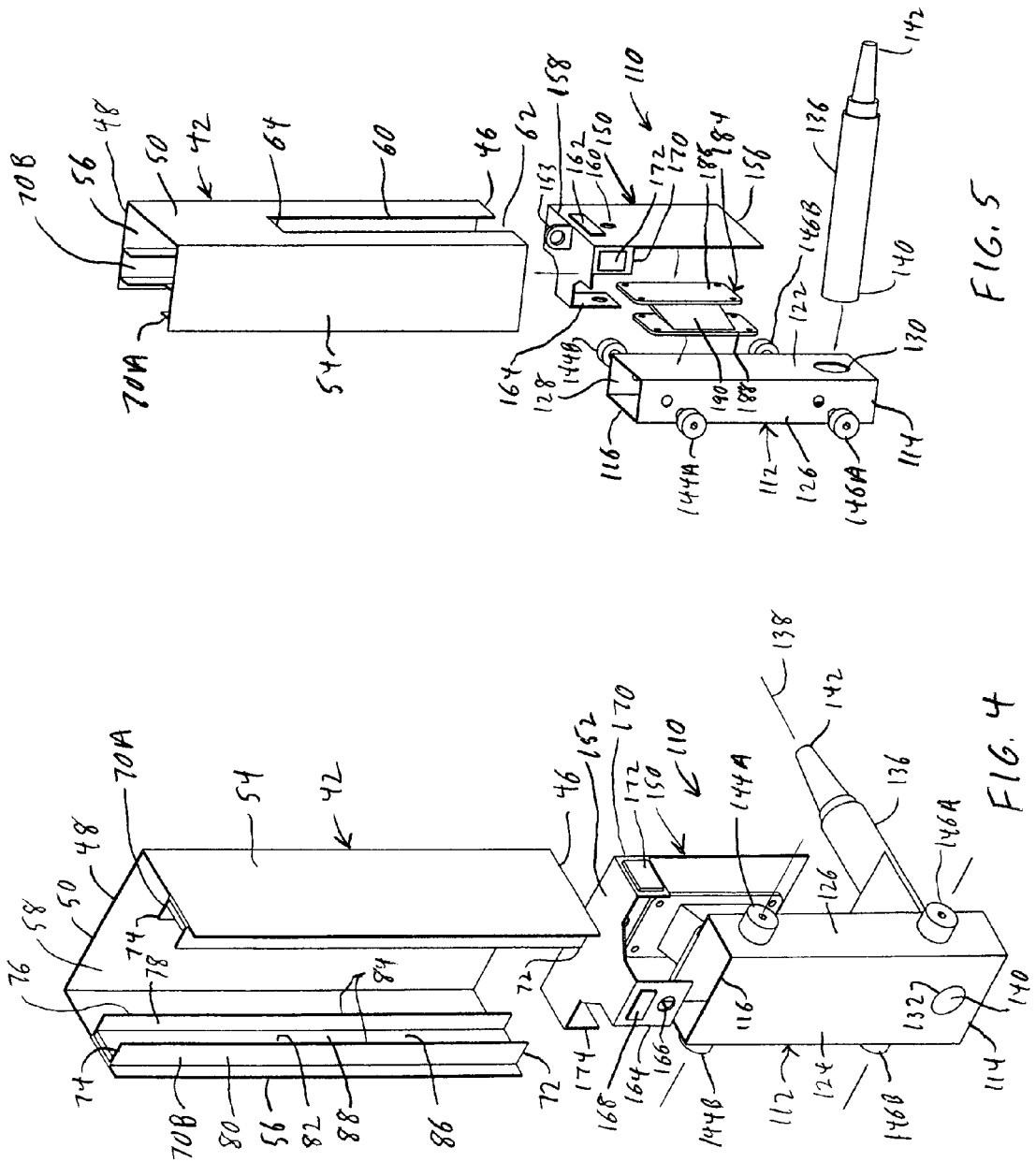

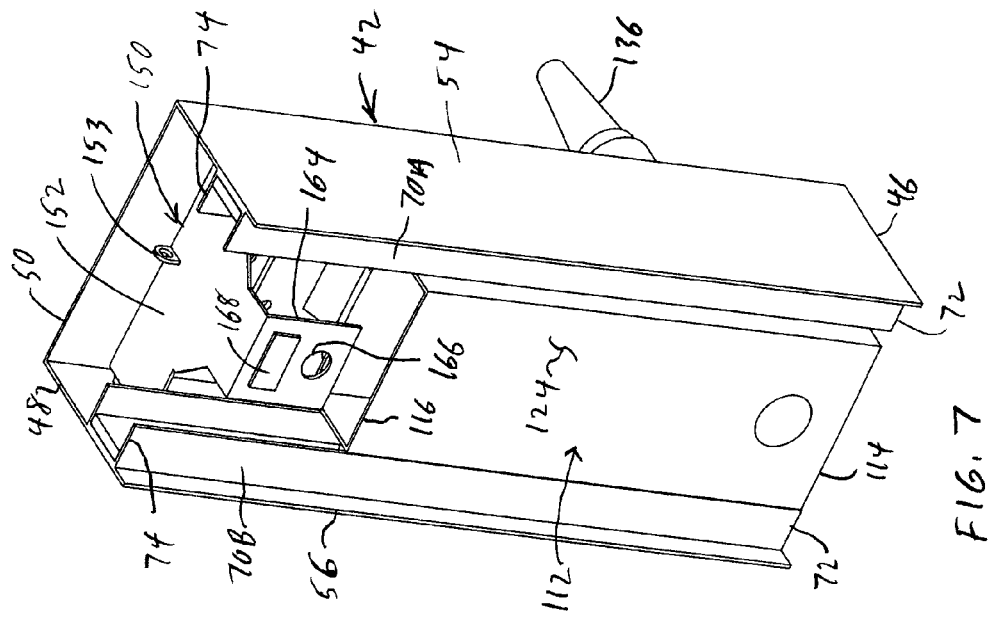
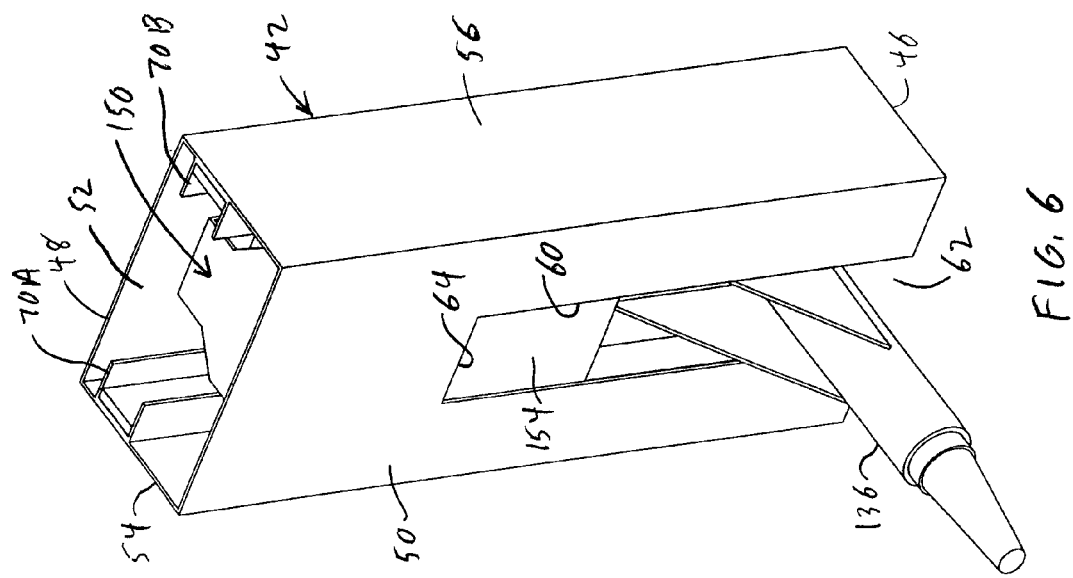
FIG. 7
FIG. 6

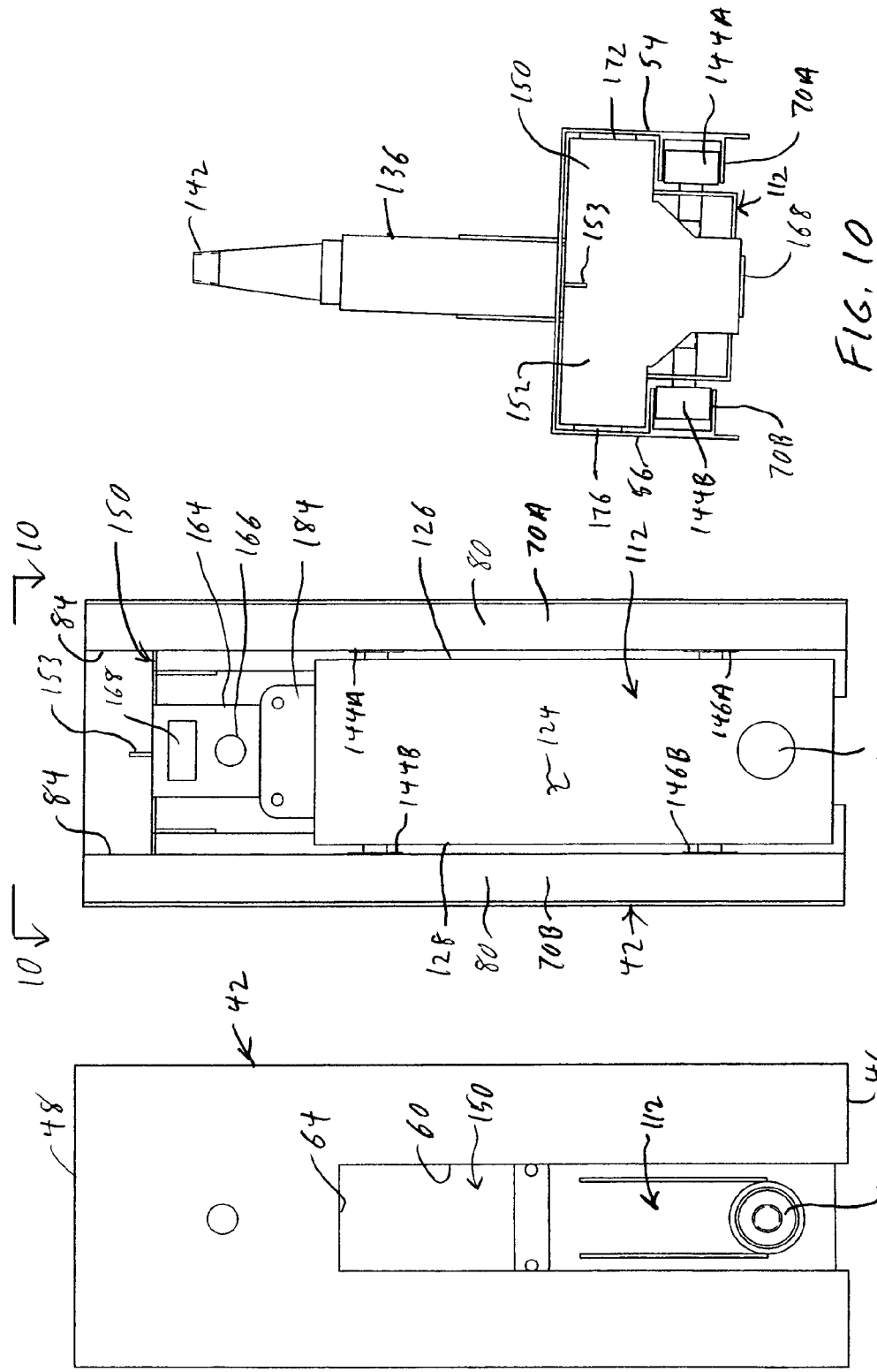

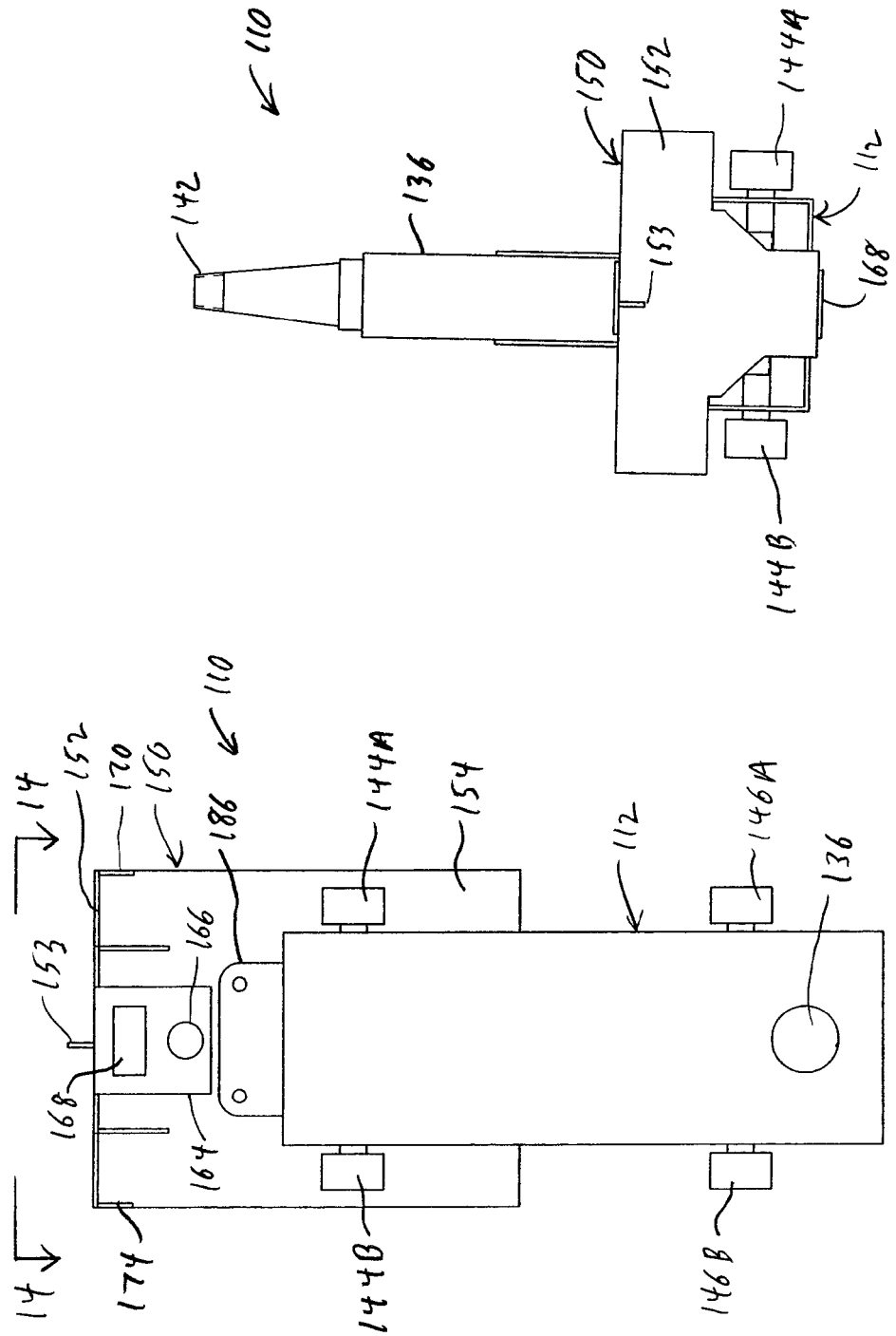

INDEPENDENT ADJUSTABLE AXLE SUSPENSION SYSTEM

BACKGROUND

The present disclosure is directed to an independent adjustable axle suspension system for mounting a wheel to a frame of a trailer for transport of the trailer over a support surface, and in particular to an axle suspension system having a tower adapted to be attached to the frame and an axle unit having an axle adapted to be mounted to the wheel wherein the tower is selectively moveable with respect to the axle unit between extended and retracted positions to thereby selectively position the height of the frame with respect to the wheel and the support surface.

Trailers are adapted to be attached to a vehicle for movement over a support surface from a first location to a desired second location. Trailers typically include a frame that is adapted to be removably attached to the vehicle. The frame supports a floor and one or more axles are attached to the frame, with each axle having one or more rotatable wheels. The frame also often supports an enclosure that forms a useable interior space above the floor and that is typically accessible through one or more doors in the enclosure. The interior space within the enclosure may be used for various purposes, including the receipt and storage of goods for transport, bathroom facilities for use by individuals, or various types of work space or living space for use by individuals. When the interior space is adapted for use by individuals, it has been found advantageous to be able to lower the frame and thereby the floor of the trailer from a raised transport position to a lowered stationary position, wherein the floor and frame are lowered with respect to the wheels of the trailer and the support surface on which the trailer is located. Movement by an individual between the exterior of the trailer enclosure and the interior space of the trailer enclosure is simplified when the frame is in the lowered stationary position due to the lowered height of the frame and floor with respect to the support surface. The ability to lower the frame and floor of the trailer with respect to the wheels and thereby the support surface enables the trailer to meet access requirements as established by the Americans with Disabilities Act (ADA).

SUMMARY

An adjustable axle suspension system for mounting a wheel to a frame of a trailer for transport of the trailer and frame over a support surface. The axle suspension system includes a tower having a housing. The housing is adapted to be attached to the frame of the trailer. The axle suspension system also includes an axle unit associated with the housing. The axle unit includes a truck, a mounting member attached to the truck and an axle attached to the truck. The axle is adapted to be attached to the wheel. One or more guide assemblies operatively attach the truck to the housing of the tower such that the axle unit and the housing are selectively moveable with respect to one another. Each guide assembly includes an elongate guide member and one or more retainer members. Each retainer member is operatively associated with a guide member such that the guide members and retainer members are adapted to allow generally linear movement of the tower and frame with respect to the axle unit, the wheel and the support surface. The mounting member of the truck is operatively connected to the tower by an actuator. The tower is moveable with respect to the axle unit between a retracted position and an extended position. The actuator member is adapted to selectively move the tower with respect to the axle unit and the support surface between the retracted position of the tower and the extended position of the tower to thereby selectively position the frame of the trailer with respect to the wheel and thereby selectively position the height of the frame of the trailer with respect to the support surface.

BRIEF DESCRIPTION OF THE DRAWING FIGURES

FIG. 2 is a rear elevational view of the axle suspension unit with the tower and axle unit shown in the extended transport position and with the rear wall of the tower housing removed for purposes of illustration.

FIG. 3 is a top plan view of the axle suspension system taken along line 3-3 of FIG. 2.

FIG. 4 is a rear perspective view of the axle unit and housing of the tower with the rear wall of the housing removed for purposes of illustration.

FIG. 5 is an exploded view of the axle unit shown in connection with the housing of the tower with the rear wall of the housing removed for purposes of illustration.

FIG. 6 is a perspective view of the axle unit and housing of the tower shown with the housing and axle unit in the extended transport position.

FIG. 7 is a rear perspective view of the axle unit and housing of the tower with the housing and axle unit shown in the extended transport position and with the rear wall of the housing removed for purposes of illustration.

FIG. 8 is a front elevational view of the axle unit and housing of the tower with the housing and axle unit shown in the extended transport position.

FIG. 9 is a rear elevational view of the axle unit and housing of the tower with the housing and axle unit shown in the extended transport position and with the rear wall of the housing removed for purposes of illustration.

FIG. 10 is a top plan view of the axle unit and housing, with the rear wall of the housing removed, as taken along line 10-10 of FIG. 9.

FIG. 13 is a rear elevational view of the axle unit.

FIG. 14 is a top plan view of the axle unit as taken along line 14-14 of FIG. 13.

DETAILED DESCRIPTION

Figure 1:
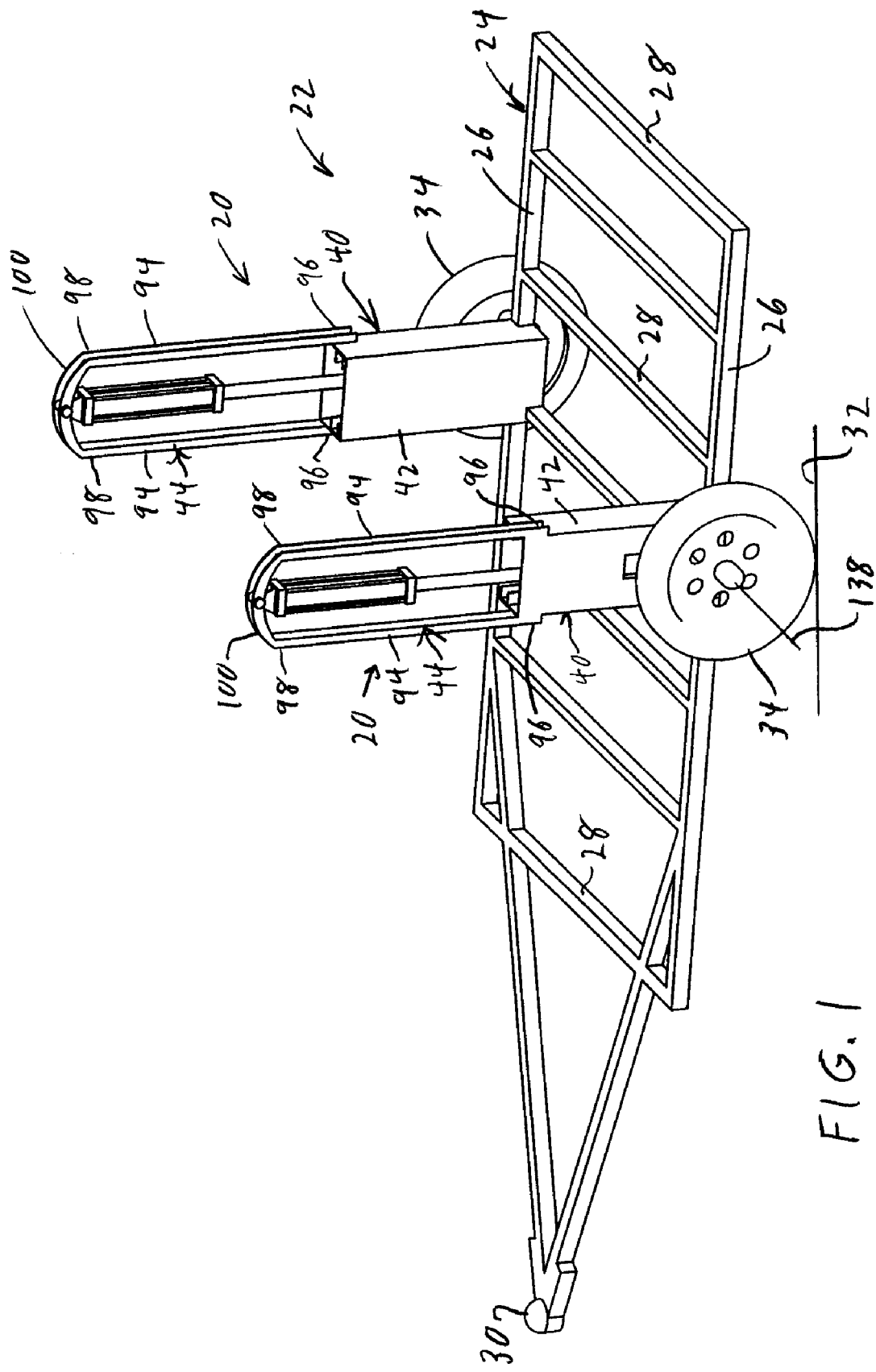
FIG. 1 is perspective view of a trailer including a left axle suspension system and a right axle suspension system according to the present disclosure.
Figure 12:
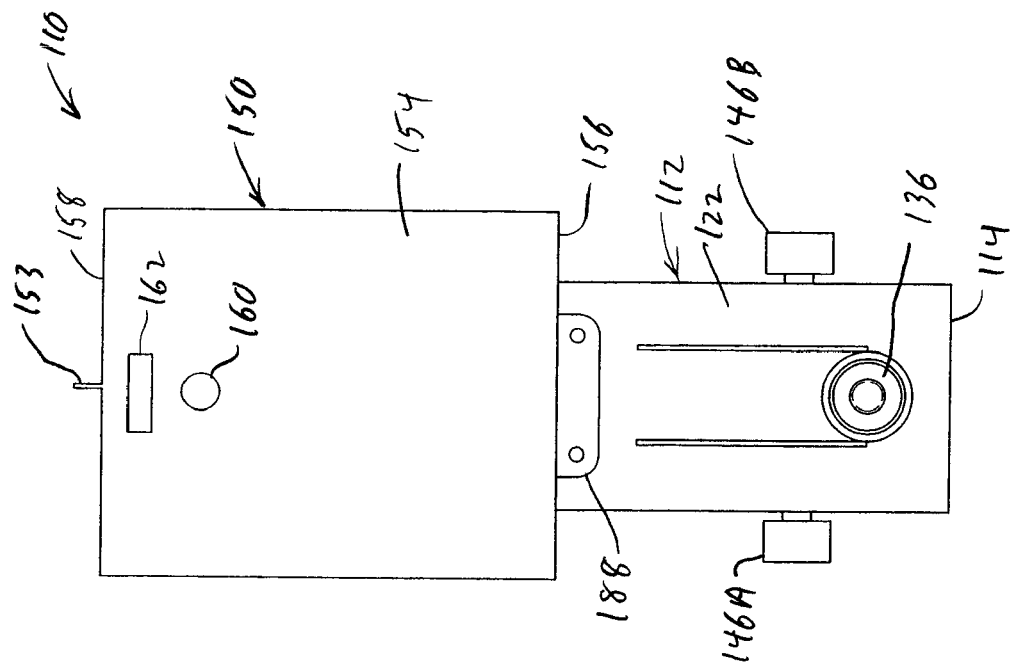
FIG. 12 is a front elevational view of the axle unit.
Figure 11:
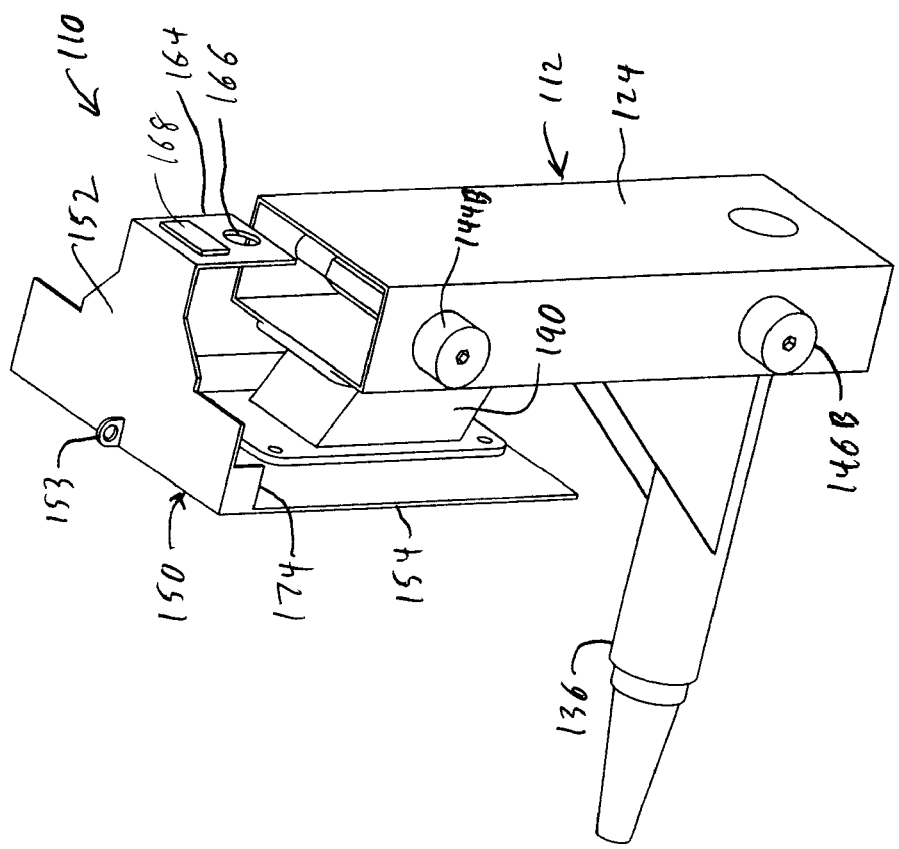
FIG. 11 is a perspective view of the axle unit.

FIG. 1 shows two independent adjustable axle suspension systems 20 of the present disclosure in connection with a trailer 22. The trailer 22 includes a frame 24 having two parallel and spaced apart elongate side rails 26. A plurality of center rails 28 extend transversely between the side rails 26 and are spaced apart generally parallel to one another. The center rails 28 are spaced apart from one another along the length of the side rails 26. A hitch 30 is attached to the frame 24. The hitch 30 is adapted to releasably attach the trailer 22 to a vehicle or other mechanized equipment such that the vehicle may tow the trailer 22 over a support surface 32, such as for example, the ground, a road, a parking lot and the like. A left axle suspension system 20 is adapted to be attached to the left side rail 26 and a right axle suspension system 20 is adapted to be attached to the right side rail 26. The axle suspension systems 20 are located transversely across from one another with respect to the longitudinal axis of the frame 24. A wheel 34 is adapted to be removably attached to each axle suspension system 20. Each wheel 34 is rotatably attached to the frame 24 for rotation about a central axis and is adapted to be supported on the support surface 32. The frame 24 is located substantially parallel to and spaced apart from and above the support surface 32. The wheels 34 support the frame 24 at a height or vertical distance above the support surface 32 for transport of the frame 24 over the support surface 32.

As shown in FIG. 1, the trailer 22 includes two axle suspension systems 20. However, the trailer 22 may include one or more axle suspension systems 20 as desired. As shown in FIG. 1, the two axle suspension systems 20 are spaced apart from one another transversely with respect to the longitudinal axis of the trailer 22 to provide a maximum amount of clearance between the axle suspension systems 20. The trailer 22 may include a floor (not shown) supported on top of, or formed with, the frame 24. The trailer 22 may also include an enclosure (not shown) supported by the frame 24 above the floor that forms a useable interior space. The enclosure may include one or more doors to provide access to the interior space of the enclosure. The enclosure may include a rear wall, a front wall, two parallel and spaced apart side walls, and a roof.

Each axle suspension system 20 includes a tower 40. The tower 40 includes a housing 42 and a bracket 44. The housing 42 extends generally vertically between a lower first end 46 and upper second end 48. The housing 42 is formed generally as a rectangular tube having a generally planar front wall 50, a generally planar rear wall 52 that is spaced apart from and generally parallel to the front wall 50, a generally planar first side wall 54, and a generally planar second side wall 56. The first and second side walls 54 and 56 are spaced apart from, and are generally parallel to, one another. The first and second side walls 54 and 56 extend between respective ends of the front and rear walls 50 and 52 and are generally perpendicular thereto. The rear wall 52 may be removably attached to the first and second side walls 54 and 56. The first end 46 of the housing 42 is adapted to be attached to the frame 24 of the trailer 22 at a side rail 26. The walls 50, 52, 54 and 56 each include a respective generally planar interior surface and a respective generally planar exterior surface. The housing 42 is generally open at the first end 46 and second end 48, and forms a generally hollow interior chamber 58. The front wall 50 includes an elongate generally linear slot 60. The slot 60 extends generally linearly between a lower first end 62 and an upper second end 64. The lower first end 62 of the slot 60 may be located at the first end 46 of the housing 42 such that the slot 60 has an open end at the first end 62. The upper second end 64 of the slot 60 is spaced apart from the second end 48 of the housing 42. The slot 60 is generally centrally located in the front wall 50 between the first and second side walls 54 and 56.

The axle suspension system 20 also includes one or more guide assemblies including a guide member and one or more retainer members operatively associated with the guide member. The tower 40 may include one or more guide members. As shown in the drawings, the housing 42 of the tower 40 includes a first guide member 70A and a second guide member 70B. The guide member 70A is attached to, and may be integrally formed with, the interior surface of the first side wall 54. The guide member 70B is attached to, and may be integrally formed with, the interior surface of the second side wall 56. Each guide member 70A and B extends generally linearly between a lower first end 72 and an upper second end 74. The guide members 70A and B are spaced apart in opposing relationship to one another and are generally parallel to each other. The first ends 72 of the guide members 70A and B are located adjacent the first end 46 of the housing 42 and the second ends 74 of the guide members 70A and B are located adjacent the second end 48 of the housing 42. Each guide member 70A and B may comprise a track including a generally planar first flange 76 having a generally planar interior surface 78, and a generally planar second flange 80 having a generally planar interior surface 82. The flanges 76 and 80 extend from the first end 72 to the second end 74 of the guide members. The first and second flanges 76 and 80 are spaced apart and generally parallel to one another as are their respective interior surfaces 78 and 82. Each flange 76 and 80 extends inwardly from its respective side wall to an elongate generally linear edge 84. An elongate generally linear channel 86 is formed between the flanges 76 and 80. Each guide member 70A and 70B may include a generally planar web 88 located adjacent to or formed integrally with a respective side wall 54 and 56 and that extends between the exterior edges of the flanges 76 and 80, such that each guide member 70A and B is generally C-shaped in cross section. The front wall 50 of the housing 42 is adapted to be located outwardly from the rear wall 52 with respect to the central longitudinal axis of the frame 24 and generally parallel to the longitudinal axis of the frame 24.

The bracket 44 of the tower 40 includes a pair of spaced apart elongate and generally linear legs 94. Each leg 94 includes a lower first end 96 and an upper second end 98. The lower first end 96 of each leg 94 is adapted to be attached to a respective side wall 54 or 56 of the housing 42 at the second end 48 of the housing 42. The legs 94 are located adjacent the front wall 50 of the housing 42. The legs 94 are spaced apart and generally parallel to one another. The bracket includes a cross member 100 that extends between the second ends 98 of the legs 94. The bracket 44 is in the general shape of an inverted U. The bracket 44 may be formed from a generally C-shaped member, from tubing, or the like.

Each axle suspension system 20 also includes an axle unit 110. The axle unit 110 is substantially disposed within the chamber 58 of the housing 42. The axle unit 110 includes a truck 112 that may be formed as a generally rectangular tube. The truck 112 extends between a lower first end 114 and an upper second end 116. The truck 112 includes a body having a generally planar front wall 122, a spaced apart and generally parallel planar rear wall 124, a generally planar first side wall 126 extending generally perpendicularly between the front wall 122 and rear wall 124, and a generally planar second side wall 128 extending generally perpendicularly between the front wall 122 and rear wall 124 and spaced apart and generally parallel to the first side wall 126. The front wall 122 includes an aperture 130 adjacent the first end 114, and the rear wall 124 includes an aperture 132 adjacent the first end 114. The apertures 130 and 132 are generally coaxially aligned with one another and are in communication with one another. The axle unit 110 also includes an elongate generally linear axle 136 having a central axis 138. The axle 136 extends between a proximal end 140 and a distal end 142. The proximal end 140 of the axle 136 is adapted to be inserted into the apertures 130 and 132 of the front and rear walls 122 and 124 and connected thereto by welding or the like. The central axis 138 of the axle 136 is disposed generally perpendicular to the central longitudinal axis of the truck 112 and to the central longitudinal axis of the frame 24. The distal end 142 of the axle 136 is adapted to be releasably connected to the wheel 34 in a manner well known in the art, such that the wheel 34 may be removably mounted to the axle 136 for rotational movement about the central axis 138 with respect to the frame 24.

One or more retainer members of the guide assembly are attached to the truck 112. As shown in FIGS. 4 and 5, an upper first retainer member 144A is connected to the first side wall 126 of the truck 112 adjacent the second end 116. An upper first retainer member 144B is connected to the second side wall 128 of the truck 112 adjacent the second end 116. A lower second retainer member 146A is connected to the first side wall 126 adjacent the first end 114 of the truck 112. A lower second retainer member 146B is connected to the second side wall 128 at the first end 114 of the truck 112. The first retainer member 144A is spaced apart from the second retainer member 146A along the length of the truck 112. Similarly, the first retainer member 144B is spaced apart from the second retainer member 146B along the length of the truck 112. The first retainer members 144A and 144B are located generally coaxial with one another, and the second retainer members 146A and 146B are located generally coaxial with one another. Each retainer member 144A-B and 146A-B may comprise a generally cylindrical roller or wheel that is rotatably connected to the truck 112 for rotation about a central axis. Each roller includes a generally circular or cylindrical surface and a generally planar outer end surface. The first and second retainer members 144A and 146A are adapted to be located within the channel 86 formed between the first and second flanges 76 and 80 of the guide member 70A. The first and second retainer members 144B and 146B are adapted to be located within the channel 86 formed between the first and second flanges 76 and 80 of the guide member 70B. The retainer members 144A and 146A and the guide member 70A are interlocked with one another, and the retainer members 144B and 146B and the guide member 70B are interlocked with one another, while allowing guided generally linear movement with respect to one another and inhibiting transverse movement with respect to one another. Alternatively, the guide members 70A-B may be attached respectively to the side walls 126 and 128 of the truck 112, and the retainer members 144A-B and 146A-B may be attached respectively to the side walls 54 and 56 of the housing 42.

The rollers that form the first and second retainer members 144A-B and 146A-B have a diameter that is slightly shorter than the distance between the interior surfaces 78 and 82 of the first and second flanges 76 and 80 of the guide members 70A and B. Each roller that comprises the retainer members 144A-B and 146A-B may freely rotate in engagement with one of either the interior surface 78 or interior surface 82 without engaging the other surface. The distance between the end walls of the retainer members 144A and 144B, and between the retainer members 146A and 146B, is slightly shorter than the distance between the webs 88 of the opposing guide members 70A and B. When the axle 136 is supporting the weight and load of the trailer 22, the rollers of the first retainer members 144A and B are in respective rotational engagement with the interior surfaces 82 of the second flanges 80 of the guide members 70A and B, and the rollers of the second retainer members 146A and B are in respective rotational engagement with the interior surfaces 78 of the first flanges 76 of the guide members 70A and B.

The axle unit 110 also includes a mounting member 150. The mounting member 150 includes a generally planar plate-like horizontal cap 152. The cap 152 includes a connector member 153, such as a plate-like member having an aperture, attached to the top surface of the cap 152 and adjacent the front edge of the cap 152. The mounting member 150 also includes a generally planar and plate-like vertical face plate positioning member 154 that extends from a bottom end 156 to a top end 158 that is connected to the cap 152. The face plate 154 is generally perpendicular to the cap 152 and is adapted to be located parallel to and adjacent the interior surface of the front wall 50 of the housing 42. The face plate 154 is adapted to cover a portion of the slot 60. The face plate 154 includes a locking aperture 160 located a distance downwardly from the top end 158. A low-friction pad member 162 is attached to the exterior surface of the face plate 154 adjacent the top end 158 and between the locking aperture 160 and top end 158.

The mounting member 150 also includes a generally plate-like vertical rear positioning member 164 that extends downwardly from a rear edge of the cap 152 and that is generally parallel to and spaced apart from the face plate 154. The rear member 164 is adapted to be located adjacent to and generally parallel to the rear wall 52 of the housing 42. The rear member 164 includes a locking aperture 166 that is aligned generally coaxially with the locking aperture 160 of the face plate 154. The rear member 164 also includes a low-friction pad member 168 located on the exterior surface of the rear member 164 between the locking aperture 166 and the cap 152. The mounting member 150 includes a generally planar and plate-like vertical first side positioning member 170 that extends downwardly from the cap 152 and adjacent the face plate 154. The first side member 170 is adapted to be located generally parallel to and adjacent the first side wall 54 of the housing 42. A low-friction pad member 172 is attached to the outer surface of the first side member 170. The mounting member 150 also includes a generally planar and plate-like vertical second side positioning member 174 that extends downwardly from the cap 152 and adjacent the face plate 154. The second side member 174 is adapted to be located generally parallel to and adjacent the second side wall 56 of the housing 42. A low-friction pad member 176 is attached to the outer surface of the second side member 174. The first and second side members 170 and 174 are generally parallel to one another and perpendicular to the cap 152, face plate 154 and rear member 164. The positioning members 154, 164, 170 and 174, and their low-friction pad members, are adapted to properly position the axle unit 110 within the housing 42 and to provide guided sliding movement of the housing 42 with respect to the axle unit 110.

The axle unit 110 also includes a shock absorber 184. As shown in FIG. 5, the shock absorber 184 includes a first mounting plate 186 that is adapted to be connected to the interior surface of the face plate 154 of the mounting member 150. The shock absorber 184 also includes a second mounting plate 188 spaced apart from and generally parallel to the first mounting plate 186. The second mounting plate 188 is adapted to be attached to the front wall 122 of the truck 112. A resilient elastomeric shock absorbing member 190 extends between, and is connected at each end respectively to, the first mounting plate 186 and second mounting plate 188. The shock absorber 184 is adapted to absorb shocks that are transmitted from the wheel 34 and axle 136 of the truck 112 toward the mounting member 150. The cross-sectional configuration of the shock absorbing member 190, and the hardness of the material that forms the shock absorbing member 190, may be varied as desired to provide desired shock absorbing characteristics for loads of various selected magnitudes.

The axle suspension system 20 also includes an actuator 200 as shown in FIG. 2. The actuator 200 extends along a generally linear central axis 202 between a first end 204 that is adapted to be connected to the connector member 153 of the mounting member 150, and a second end 206 that is adapted to be connected to the cross member 100 of the bracket 44. The actuator 200 includes an elongate housing 208 and an elongate ram 210 having an outer end at the first end 204 of the actuator 200. The ram 210 is selectively extendable and retractable within the housing 208. The length of the actuator 200 between the first end 204 and second end 206 may be selectively adjusted as desired. The actuator 200 may comprise a hydraulic cylinder. The actuator 200 may alternatively comprise a pneumatic cylinder, and may comprise a threaded rod rotatably attached at one end to the mounting member 150 and rotationally and threadably attached at the second end to the cross member 100. The ram 210 is selectively extendable and retractable with respect to the housing 208 along the axis 202.

In operation, when the frame 24 and trailer 22 are to be transported over the support surface 32, the ram 210 of the actuator 200 is extended from the housing 208 to locate the housing 42 of the tower 40 and thereby the frame 24 in a raised or extended transport position with respect to the axle unit 110 and wheel 34 and thereby the support surface 32. When the tower 40 and the axle unit 110 are in the extended transport position, the second retainer members 146A and B of the truck 112 are located adjacent the first end 72 of the guide members 70A and B of the housing 42, and the axle 136 is located adjacent the bottom or first end 62 of the slot 60 in the front wall 50 of the housing 42 and adjacent the bottom or first end 46 of the housing 42. When the tower 40 is in the extended or raised transport position, a locking member such as a pin or the like, may be removably inserted through the locking apertures 160 and 166 of the mounting member 150 of the axle unit 110 and through aligned apertures (not shown) in the front wall 50 and rear wall 52 of the housing 42. The mounting member 150 of the axle unit 110 is thereby rigidly, although releasably, connected to the housing 42 such that the weight of the trailer 22 and the load of the trailer 22 is transferred directly from the housing 42 to the mounting member 150 by the locking member, such that the actuator 200 does not need to support the load of the trailer 22 during transport. When the axle unit 110 is in the extended or raised transport position, the frame 24 of the trailer 22 is located a first distance vertically above the support surface 32 and at a first location with respect to the wheel 34.

After the trailer 22 has been transported to a location where the trailer 22 is intended to remain in a stationary position, the locking member may be removed from the mounting member 150 of the axle unit 110 and the housing 42. The tower 40 is then selectively slidably and linearly moveable with respect to the axle unit 110 as guided by the guide members 70A and B and the positioning members 154, 164, 170 and 174 of the mounting member 150. The tower 40 and its housing 42 may then be moved to a lowered or retracted stationary position with respect to the axle unit 110 and support surface 32 by retracting the ram 210 into the housing 208 of the actuator 200. As the ram 210 is retracted into the housing 208, the retainer members 144A-B and 146A-B roll along the guide members 70A and B, with the first retainer members 144A-B in rolling engagement with the interior surfaces 82 of the second flanges 80 of the guide members 70A and B, and the second retainer members 146A-B in rolling engagement with the interior surfaces 78 of the first flanges 76 of the guide members 70A and B, as the housing 42 of the tower 40 is lowered with respect to the axle unit 110. The guide members 70A and B thereby guide linear sliding movement of the housing 42 and tower 40 between the raised or extended transport position and the lowered or retracted stationary position wherein the first retainer members 144A-B are located adjacent the top or second end 74 of the guide members 70A-B, and the axle 136 is located adjacent the top or second end 64 of the slot 60 in the front wall 50 of the housing 42.

As the housing 42 is moved between the extended transport position and the retracted stationary position, the low-friction pads of the positioning members of the mounting member 150 are adapted to engage their respective associated walls of the housing 42 to provide additional guidance to movement of the housing 42 with respect to the axle unit 110. As the housing 42 of the tower 40 is linearly and vertically moved with respect to the axle unit 110 as directed and guided by the guide members 70A-B and retainer members 144A-B and 146A-B from the extended transport position to the retracted stationary position, the housing 42 and frame 24 of the trailer 22 are lowered with respect to the axle 136, wheel 34 and support surface 32. When the tower 40 is in the retracted stationary position with respect to the axle unit 110, the frame 24 of the trailer 22 is located a second distance above the support surface 32 which is shorter than the first distance when the tower 40 is in the extended transport position. The frame 24 may be lowered to rest directly on the support surface 32. The frame 24 and the floor supported by the frame 24 of the trailer 22 is thereby located at a relatively low height with respect to the support surface 32 to provide easy access to and from the trailer 22.

When it is desired to again transport the trailer 22 over the support surface 32, the ram 210 of the actuator 200 is extended to thereby raise the housing 42 of the tower 40 and the frame 24 of the trailer 22 with respect to the axle unit 110, wheel 34 and support surface 32 to the extended transport position in a reverse manner from that described above, as directed and guided by the guide members 70A-B and the retainer members 144A-B and 146A-B. The locking member is then inserted through the locking apertures 160 and 166 in the mounting member 150 as previously described. As the axle 136 moves downwardly within the slot 60 from the second end 64 toward the first end 62, the face plate 154 of the mounting member 150 also moves downwardly with respect to the slot 60 to increasingly cover a substantial portion of the slot 60 that is located above the axle 136.

When the trailer 22 includes two or more axle suspension systems 20, all of the axle suspension systems 20 may be operated generally in unison with one another to provide uniform movement of the frame 24 with respect to the support surface 32 and wheels 34. However, each of the axle suspension systems 20 may be operated independently of one another.

Various features of the invention have been particularly shown and described in connection with the illustrated embodiment of the invention, however, it must be understood that these particular arrangements merely illustrate, and that the invention is to be given its fullest interpretation within the terms of the appended claims.

What is claimed is:

1. An axle suspension system for mounting a wheel to a frame for transport of the frame over a support surface, said axle suspension system comprising:
   a tower adapted to be attached to the frame;
   an axle unit associated with said tower, said axle unit including a truck, an axle connected to said truck and adapted to be attached to the wheel, and a mounting member connected to said truck and operatively connected to said tower;
   one or more guide assemblies operatively connecting said tower to said truck of said axle unit such that said tower is selectively moveable with respect to said axle unit, said guide assemblies providing guidance to said tower as said tower moves relative to said axle unit, each said guide assembly comprising a guide member having a first flange and a spaced apart and generally parallel second flange, each said flange extending generally linearly between a first end and a second end;

whereby said tower is adapted to be selectively moved with respect to said axle unit between a retracted position and an extended position to thereby selectively position the frame with respect to the support surface.

2. The axle suspension system of claim 1 wherein each said guide assembly comprises one or more retainer members operatively associated with said guide member of said guide assembly, said guide members and retainer members adapted to provide guided movement of said tower with respect to said axle unit.

3. The axle suspension system of claim 2 wherein said one or more guide assemblies comprise a first guide assembly including a first guide member, and a second guide assembly including a second guide member generally parallel to said first guide member.

4. The axle suspension system of claim 3 wherein said one or more retainer members of said first guide assembly comprise one or more first retainer members operatively associated with said first guide member, and said one or more retainer members of said second guide assembly comprise one or more second retainer members operatively associated with said second guide member.

5. The axle suspension system of claim 4 wherein said truck includes a body having a first side wall and a second side wall, said first side wall of said body including said one or more first retainer members and said second side wall of said body including said one or more second retainer members.

6. The axle suspension system of claim 5 wherein each said retainer member comprises a roller rotatably attached to said body of said truck, each said roller being located between said first and second flanges of a guide member.

7. The axle suspension system of claim 5 wherein each said first retainer member is generally coaxially aligned with a respective second retainer member.

8. The axle suspension system of claim 5 wherein said body of said truck comprises a generally rectangular tube.

9. The axle suspension system of claim 1 including a shock absorber connected to said truck and to said mounting member.

10. The axle suspension system of claim 1 wherein said tower includes a housing having a first end and a second end, said housing including a first side wall, a second side wall opposing said first side wall, a front wall and a rear wall located between said first wall and said second wall, said one or more guide assemblies comprising a first guide member, a second guide member, one or more first retainer members and one or more second retainer members, one of said first guide member and said one or more first retainer members being attached to said first side wall of said housing, and one of said second guide member and said one or more second retainer members being attached to said second side wall of said housing.

11. The axle suspension system of claim 1 including an actuator member connected to said tower and to said axle unit, said actuator member adapted to selectively move said tower with respect to said axle unit.

12. The axle suspension system of claim 11 wherein said actuator member comprises a selectively extendable and retractable ram.

13. An axle suspension system for mounting a wheel to a frame for transport of the frame over a support surface, said axle suspension system comprising:

a housing adapted to be attached to the frame;

an axle unit associated with said housing, said axle unit including a truck located within said housing, and an axle attached to said truck and adapted to be attached to the wheel;

one or more guide assemblies operatively attaching said housing to said truck, each said guide assembly including an elongate guide member and or more retainer members slidably interlocked with said guide member, said guide member being attached to one of said housing and said truck and said one or more retainer members being attached to the other of said housing and said truck, said guide assemblies adapted to provide guided movement of said housing with respect to said axle unit between a retracted position and an extended position; and an actuator member attached to said housing and to said axle unit, said actuator member adapted to selectively move said housing with respect to said axle unit between said retracted position and said extended position to thereby selectively position the frame with respect to the support surface.

14. The axle suspension system of claim 13 wherein said axle unit includes a mounting member attached to said truck, said actuator member attached to said mounting member, said mounting member including one or more positioning members adapted to slidably engage and guide said housing as said housing is moved between said retracted and extended positions.

15. An axle suspension system for mounting a wheel to a frame for transport of the frame over a support surface, said axle suspension system comprising:

a tower adapted to be attached to the frame, said tower including a housing having a front wall;

an axle unit associated with said tower, said axle unit including a truck, an axle connected to said truck and adapted to be attached to the wheel, and a mounting member connected to said truck and operatively connected to said tower;

one or more guide assemblies operatively connecting said tower to said truck of said axle unit such that said tower is selectively moveable with respect to said axle unit, said guide assemblies providing guidance to said tower as said tower moves relative to said axle unit;

said front wall of said housing including an elongate slot adapted to receive said axle of said axle unit, said mounting member of said axle unit including a face plate located adjacent to said front wall of said housing of said tower, said face plate including a top end and a bottom end, said bottom end being located above said axle, said face plate adapted to selectively cover various portions of said slot in said front wall of said housing as said tower is moved with respect to said axle unit;

whereby said tower is adapted to be selectively moved with respect to said axle unit between a retracted position and an extended position to thereby selectively position the frame with respect to the support surface.

16. The axle suspension system of claim 15 wherein said mounting member includes a rear positioning member adapted to be located adjacent said rear wall of said housing, a first side positioning member adapted to be located adjacent said first side wall of said housing, and a second side positioning member adapted to be located adjacent said second side wall of said housing.

17. The axle suspension system of claim 16 wherein said face plate, said first side positioning member, said second side positioning member and said rear positioning member each include a respective low friction member adapted to engage said housing.

18. An axle suspension system for mounting a wheel to a frame for transport of the frame over a support surface, said axle suspension system comprising:

a tower adapted to be attached to the frame;

an axle unit associated with said tower, said axle unit including a truck, an axle connected to said truck and adapted to be attached to the wheel, and a mounting member connected to said truck and operatively connected to said tower;

one or more guide assemblies operatively connecting said tower to said truck of said axle unit such that said tower is selectively moveable with respect to said axle unit, said guide assemblies providing guidance to said tower as said tower moves relative to said axle unit;

an actuator member connected to said tower and to said axle unit, said actuator member adapted to selectively move said tower with respect to said axle unit;

said tower including a housing adapted to receive said axle unit, said housing including a first end and a second end, and a bracket attached to said second end of said housing, said actuator member having a first end connected to said mounting member of said axle unit and a second end connected to said bracket;

whereby said tower is adapted to be selectively moved with respect to said axle unit between a retracted position and an extended position to thereby selectively position the frame with respect to the support surface.

19. The axle suspension system of claim 18 wherein said bracket includes a leg having a first end and a second end, said first end of said leg attached to said housing, said second end of said leg attached to said actuator member.

20. The axle suspension system of claim 18 wherein said actuator member comprises a selectively extendable and retractable ram.

* * * * *